(12) United States Patent
Albero et al.

(10) Patent No.: US 11,463,443 B2
(45) Date of Patent: Oct. 4, 2022

(54) REAL-TIME MANAGEMENT OF ACCESS CONTROLS

(71) Applicant: Bank of America Corporation, Charlotte, NC (US)

(72) Inventors: George Albero, Charlotte, NC (US); Elijah Clark, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 498 days.

(21) Appl. No.: 16/576,129

(22) Filed: Sep. 19, 2019

(65) Prior Publication Data

US 2021/0092124 A1 Mar. 25, 2021

(51) Int. Cl.
| | |
|---|---|
| *H04L 29/06* | (2006.01) |
| *H04L 9/40* | (2022.01) |
| *G06Q 10/06* | (2012.01) |
| *G06N 5/04* | (2006.01) |
| *G06N 20/00* | (2019.01) |

(52) U.S. Cl.
CPC .......... *H04L 63/104* (2013.01); *G06N 5/04* (2013.01); *G06N 20/00* (2019.01); *G06Q 10/0631* (2013.01)

(58) Field of Classification Search
CPC ... H04L 63/104; H04L 63/1425; H04L 63/10; H04L 63/20; G06N 5/04; G06N 20/00; G06Q 10/0631
See application file for complete search history.

(56) References Cited

U.S. PATENT DOCUMENTS

| | | | |
|---|---|---|---|
| 6,189,141 B1 | 2/2001 | Benitez et al. | |
| 7,941,607 B1 | 5/2011 | Thaik et al. | |
| 8,312,435 B2 | 11/2012 | Wygodny et al. | |
| 8,429,619 B2 | 4/2013 | Albert et al. | |
| 8,555,385 B1 | 10/2013 | Bhatkar et al. | |
| 8,769,344 B2 | 7/2014 | Gilkerson et al. | |
| 9,454,659 B1 | 9/2016 | Daymont | |
| 9,542,535 B1 | 1/2017 | Baumgartner et al. | |
| 9,954,980 B2 | 4/2018 | Katmor et al. | |
| 10,013,329 B2 | 7/2018 | Abdul et al. | |
| 10,305,758 B1* | 5/2019 | Bhide | H04L 41/147 |
| 2007/0143851 A1* | 6/2007 | Nicodemus | G06F 21/577 |
| | | | 726/4 |
| 2010/0306249 A1* | 12/2010 | Hill | G06F 16/9535 |
| | | | 707/769 |
| 2016/0149887 A1 | 5/2016 | Katmor et al. | |
| 2017/0017368 A1* | 1/2017 | Maheshwari | H04L 41/22 |

(Continued)

*Primary Examiner* — Mahfuzur Rahman
(74) *Attorney, Agent, or Firm* — Banner & Witcoff, Ltd.

(57) ABSTRACT

Aspects of the disclosure relate to real-time management of access controls. A computing platform may detect, via the communication interface, a trigger related to an activity of an enterprise user over a network. Then, the computing platform may retrieve, via the communication interface and from the network device, data associated with the activity. The computing platform may then compare, via the computing device, the retrieved data with a central tendency for activities with the network device. Subsequently, the computing platform may identify, based on the comparing, a deviation from the central tendency. Then, the computing platform may adjust, dynamically in real-time and in response to identifying the deviation, an access control or multiple access controls for the enterprise user to the network device.

18 Claims, 5 Drawing Sheets

(56) References Cited

U.S. PATENT DOCUMENTS

| | | | |
|---|---|---|---|
| 2017/0046374 A1* | 2/2017 | Fletcher | G06F 3/0484 |
| 2018/0024901 A1* | 1/2018 | Tankersley | G06T 11/206 |
| | | | 707/694 |
| 2018/0236191 A1* | 8/2018 | Martin | A61M 16/026 |
| 2019/0188474 A1* | 6/2019 | Zahnert | G06V 40/18 |
| 2020/0104401 A1* | 4/2020 | Burnett | G06F 16/287 |
| 2020/0104402 A1* | 4/2020 | Burnett | G06F 16/24568 |

* cited by examiner

REAL-TIME MANAGEMENT OF ACCESS CONTROLS

BACKGROUND

Aspects of the disclosure relate to deploying digital data processing systems to protect enterprise resources. In particular, one or more aspects of the disclosure relate to real-time management of access controls.

Enterprise organizations may utilize various resources to support their computing infrastructure. For large enterprise organizations, maintaining, updating, and managing network activity over the various enterprise resources may be of significant importance in protecting confidential information and/or other sensitive data that is created, transmitted, and/or used for various purposes. It may be helpful to analyze network activity to detect patterns, anomalies and so forth, so as to protect the enterprise resources. As data flows through the network in real-time, such detection and management of network activity may be time-sensitive and might need to be performed in real-time as well. Ensuring that potentially harmful activities are properly detected, and timely and targeted modifications of respective access controls are performed, in real time with speed and accuracy, may be particularly advantageous to ensure a smooth running of the enterprise infrastructure. In many instances, however, it may be difficult to manage network activity, with speed and accuracy, in an organization's complex network comprising a vast number of network devices and users with multiple access permissions to these network devices and/or other network resources, while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with real-time management of access controls.

In accordance with one or more embodiments, a computing platform having at least one processor, a communication interface, and memory may detect, via the communication interface, a trigger related to an activity of an enterprise user over a network. Then, the computing platform may retrieve, via the communication interface and from the network device, data associated with the activity. The computing platform may then compare, via the computing device, the retrieved data with a central tendency for activities with the network device. Subsequently, the computing platform may identify, based on the comparing, a deviation from the central tendency. Then, the computing platform may adjust, dynamically in real-time and in response to identifying the deviation, an access control for the enterprise user to the network device.

In some embodiments, the computing platform may train a machine learning model to adjust the access control.

In some embodiments, the computing platform may apply the machine learning model to adjust additional access controls associated with the enterprise user.

In some embodiments, the computing platform may identify a threshold associated with the access control. Then, the computing platform may adjust the access control based on the threshold. In some embodiments, the computing platform may recommend, based on the deviation, a change in the threshold.

In some embodiments, the computing platform may retrieve the data via an application programming interface associated with the network device.

In some embodiments, the central tendency may be based on a history of interactions of the enterprise user with the network device.

In some embodiments, the central tendency may be based on a history of interactions of a group of users with the network device, wherein the group includes the enterprise user.

In some embodiments, the central tendency may be based on real-time data on network activities of all enterprise users.

In some embodiments, the computing platform may adjust, dynamically and based on a predictive model, the access control.

In some embodiments, the trigger may be an indication of a change of a business role of the enterprise user, and the computing platform may adjust the access control based on the change of the business role.

In some embodiments, the computing platform may identify, in response to adjusting the access control of the enterprise user, an additional access control. Then, the computing platform may adjust, dynamically in real-time, the additional access control.

Implementations of the described techniques may include hardware, a method or process, or computer software on a computer-accessible medium.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Some aspects of the disclosure relate to detecting potentially harmful network activity, and initiating steps to mitigate the effects of such activity in a pro-active and timely manner. For example, an enterprise software server infrastructure may deploy computing resources such as network devices, web resources, file directories, software applications, and so forth. In some instances, user access may need to be restricted to some of the enterprise resources, based, for example, on an enterprise user's role within the enterprise organization. For large enterprise organizations with vast amounts of deployed resources and a large number of employees, the access restrictions may be varied and complex, and may require dynamic thresholds. Additionally, with new resources being added, changes in employment status of enterprise users, and changes in business roles, may all create a dynamic and changing environment that may require to be managed. Generally, devices have associated controllers that are managed manually. Given the vast array of network resources and associated users, such manual and local management procedures may not be adequate. Accordingly, it may be of great significance for a large enterprise organization (e.g., financial institution), with large amounts of confidential information to protect, to simultaneously manage, and dynamically modify thresholds for, enterprise-wide access controls.

Accordingly, aspects of this disclosure relate to automated management of network resources and user access controls to identify potentially harmful activities in real-time, and initiate actions to mitigate any risks that may arise from such potentially harmful activities. Identifying such potentially harmful activities via a manual process and/or based on mental steps is unlikely because it relates to vast amounts of real-time network data traffic, and such network data traffic is rapidly changing in real-time over thousands of enterprise resources. In some aspects, a manual procedure for adjusting access controls to network resources may not be adequate for timely detection of cyber security incidents. Also, since the network data may reside and/or be exchanged over a vast array of users and network devices, it necessitates a use of computing devices to access the data over networks, detect patterns and/or anomalous behaviors in real-time as the data changes, and initiate relevant action in real-time and over the network. It may be noted, that as access controls are related to resources available over a computing network, the problem of detecting potentially harmful activities across an enterprise infrastructure arises in the realm of networks, and as described herein, a solution is necessarily rooted in computer technology to overcome a problem arising in the realm of computer networks.

Figure 1A:
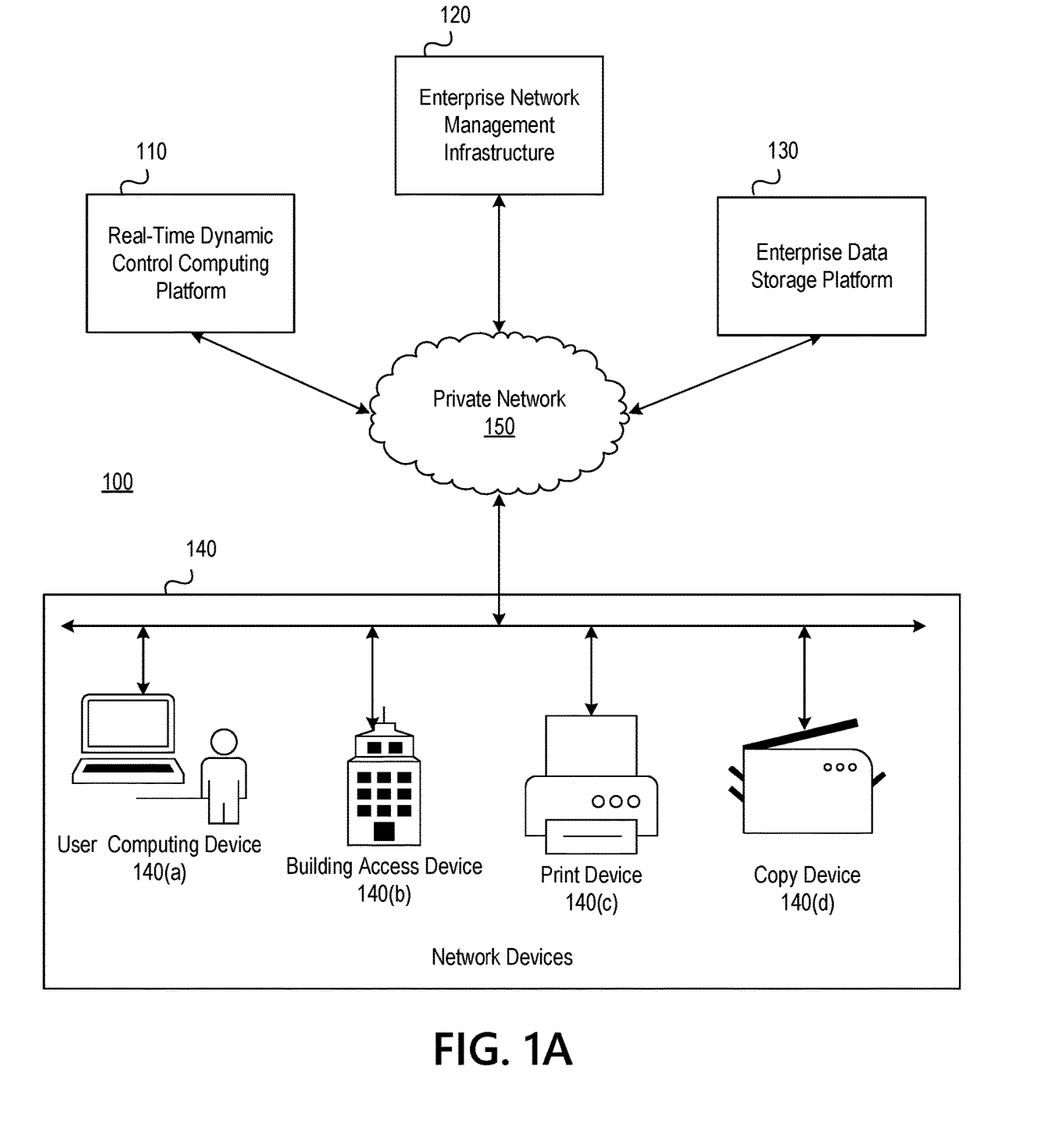
FIGS. 1A and 1B depict an illustrative computing environment for real-time management of access controls in accordance with one or more example embodiments.
Figure 1B:
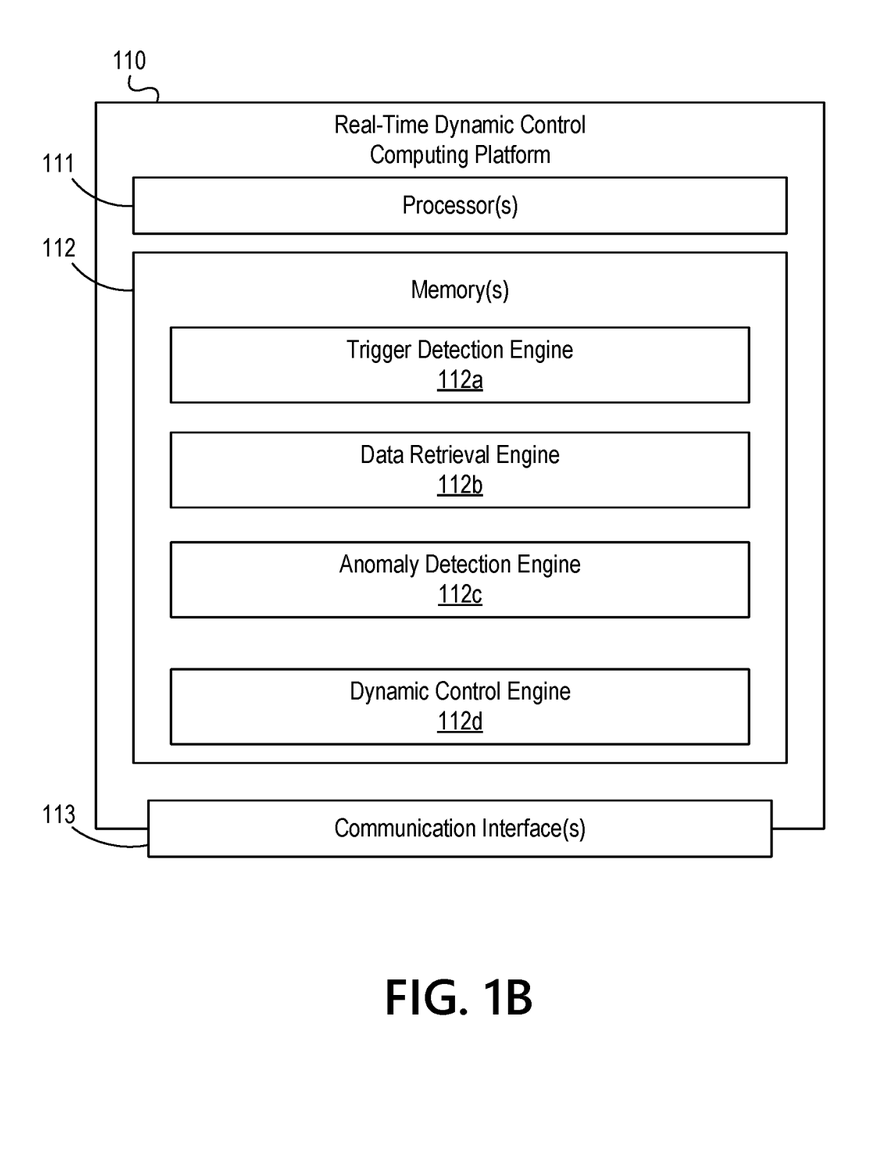

FIGS. 1A and 1B depict an illustrative computing environment for real-time management of access controls in accordance with one or more example embodiments. Referring to FIG. 1A, computing environment 100 may include one or more computer systems. For example, computing environment 100 may include real-time dynamic control computing platform 110, enterprise network management infrastructure 120, enterprise data storage platform 130, and network devices 140.

As illustrated in greater detail below, real-time dynamic control computing platform 110 may include one or more computing devices configured to perform one or more of the functions described herein. For example, real-time dynamic control computing platform 110 may include one or more computers (e.g., laptop computers, desktop computers, servers, server blades, or the like) and/or other computer components (e.g., processors, memories, communication interfaces).

Enterprise network management infrastructure 120 may include one or more computing devices and/or other computer components (e.g., processors, memories, communication interfaces). In addition, enterprise network management infrastructure 120 may be configured to manage, host, execute, and/or otherwise provide one or more enterprise applications. For example, enterprise network management infrastructure 120 may be configured to manage, host, execute, and/or otherwise provide a computing platform for various network devices and enterprise applications. In some instances, enterprise network management infrastructure 120 may be configured to provide various enterprise and/or back-office computing functions for an enterprise organization, such as a financial institution. For example, enterprise network management infrastructure 120 may include various servers and/or databases that store and/or otherwise maintain account information, such as financial account information including account balances, transaction history, account owner information, and/or other information. Also, for example, enterprise network management infrastructure 120 may include various servers and/or databases that may manage information technology resources for the enterprise organization. For example, enterprise network management infrastructure 120 may include various servers and/or databases that may manage access controls to enterprise network devices 140. Additionally, or alternatively, enterprise network management infrastructure 120 may receive instructions from real-time dynamic control computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data, including access controls to network devices and/or other resources hosted, executed, and/or otherwise provided by enterprise network management infrastructure 120. Additionally, or alternatively, enterprise network management infrastructure 120 may load data from enterprise data storage platform 130, manipulate and/or otherwise process such data, and return modified data and/or other data to enterprise data storage platform 130 and/or to other computer systems included in computing environment 100.

As described herein, enterprise network management infrastructure 120 may be configured to host, execute, and/or otherwise provide a computing platform for various network devices 140. Network devices 140 may include, for example, a plurality of, user computing devices (e.g., user computing device 140(a)), building access devices (e.g., building access device 140(b)), peripheral devices, such as, for example, print devices (e.g., print device 140(c)), copy devices (e.g., copy device 140(d)), and so forth. Generally, depending on a size of the enterprise organization, network devices 140 may typically be thousands of devices. For example, an enterprise organization (e.g., a global financial institution) may employ thousands of employees, and each employee may have access to user computing devices (e.g., user computing device 140(a)). Also, for example, the user computing devices (e.g., user computing device 140(a)) may be configured to run enterprise applications, such as electronic mail applications, web browsing applications, and so forth. A user may send and receive several electronic mail messages, and visit several internet websites each day.

Also, for example, the user computing devices (e.g., user computing device 140(a)) may be connected to peripheral devices, such as, for example, devices connected via a universal serial bus ("USB"), high-definition multimedia interface ("HDMI"), and so forth. As another example, enterprise users may initiate printing, scanning, and/or copying tasks and utilize the print devices (e.g., print device 140(c)), and the copy devices (e.g., copy device 140(d)).

As another example, the enterprise organization may have a global footprint with offices in buildings in several geographical locations. Employees at these locations may be provided with access cards that may be scanned at building access devices (e.g., building access device 140(b)) to enter and/or exit the building, or an office location in the building. Accordingly, thousands of access card data from different geographic locations may need to be managed.

Enterprise data may flow through network devices 140, and it may be significant for the enterprise organization to manage and control the type, quantity, and form of such data, and manage access control for network devices 140 in a dynamic manner in real-time.

Computing environment 100 also may include one or more networks, which may interconnect one or more of real-time dynamic control computing platform 110, enterprise network management infrastructure 120, enterprise data storage platform 130, and network devices 140. For example, computing environment 100 may include private network 150 (which may interconnect, for example, real-time dynamic control computing platform 110, enterprise network management infrastructure 120, and enterprise data storage platform 130, network devices 140, and/or one or more other systems which may be associated with an organization, such as a financial institution). In some instances, private network 150 may be a high generation cellular network, such as, for example, a fifth generation ("5G") or higher cellular network.

In one or more arrangements, real-time dynamic control computing platform 110, enterprise network management infrastructure 120, enterprise data storage platform 130, and network devices 140, and/or the other systems included in computing environment 100 may be any type of computing device capable of communicating with a user interface, receiving input via the user interface, and communicating the received input to one or more other computing devices. For example, real-time dynamic control computing platform 110, enterprise network management infrastructure 120, enterprise data storage platform 130, and network devices 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of real-time dynamic control computing platform 110, enterprise network management infrastructure 120, enterprise data storage platform 130, and network devices 140, may, in some instances, be special-purpose computing devices configured to perform specific functions.

Referring to FIG. 1B, real-time dynamic control computing platform 110 may include one or more processors 111, memory 112, and communication interface 113. A data bus may interconnect processor 111, memory 112, and communication interface 113. Communication interface 113 may be a network interface configured to support communication between real-time dynamic control computing platform 110 and one or more networks (e.g., public network, private network, a local network, or the like). Memory 112 may include one or more program modules having instructions that when executed by processor 111 cause real-time dynamic control computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of real-time dynamic control computing platform 110 and/or by different computing devices that may form and/or otherwise make up real-time dynamic control computing platform 110.

For example, memory 112 may have, store, and/or include trigger detection engine 112a, data retrieval engine 112b, anomaly detection engine 112c, and dynamic control engine 112d. Trigger detection engine 112a may have instructions that direct and/or cause real-time dynamic control computing platform 110 to detect, via the communication interface 113, a trigger related to an activity of an enterprise user over a network, as discussed in greater detail below. Data retrieval engine 112b may have instructions that direct and/or cause real-time dynamic control computing platform 110 to retrieve, via the communication interface 113 and from the network device, data associated with the activity. Anomaly detection engine 112c may have instructions that direct and/or cause real-time dynamic control computing platform 110 to compare the retrieved data with a central tendency for activities with the network device. Anomaly detection engine 112c may have instructions that direct and/or cause real-time dynamic control computing platform 110 to identify, based on the comparing, a deviation from the central tendency. Dynamic control engine 112d may have instructions that direct and/or cause real-time dynamic control computing platform 110 to adjust, dynamically in real-time and in response to identifying the deviation, an access control for the enterprise user to the network device. Dynamic control engine 112d may have instructions that direct and/or cause real-time dynamic control computing platform 110 to train a machine learning model to adjust the access control. Dynamic control engine 112d may have instructions that direct and/or cause real-time dynamic control computing platform 110 to apply the machine learning model to adjust additional access controls associated with the enterprise user.

Figure 2A:
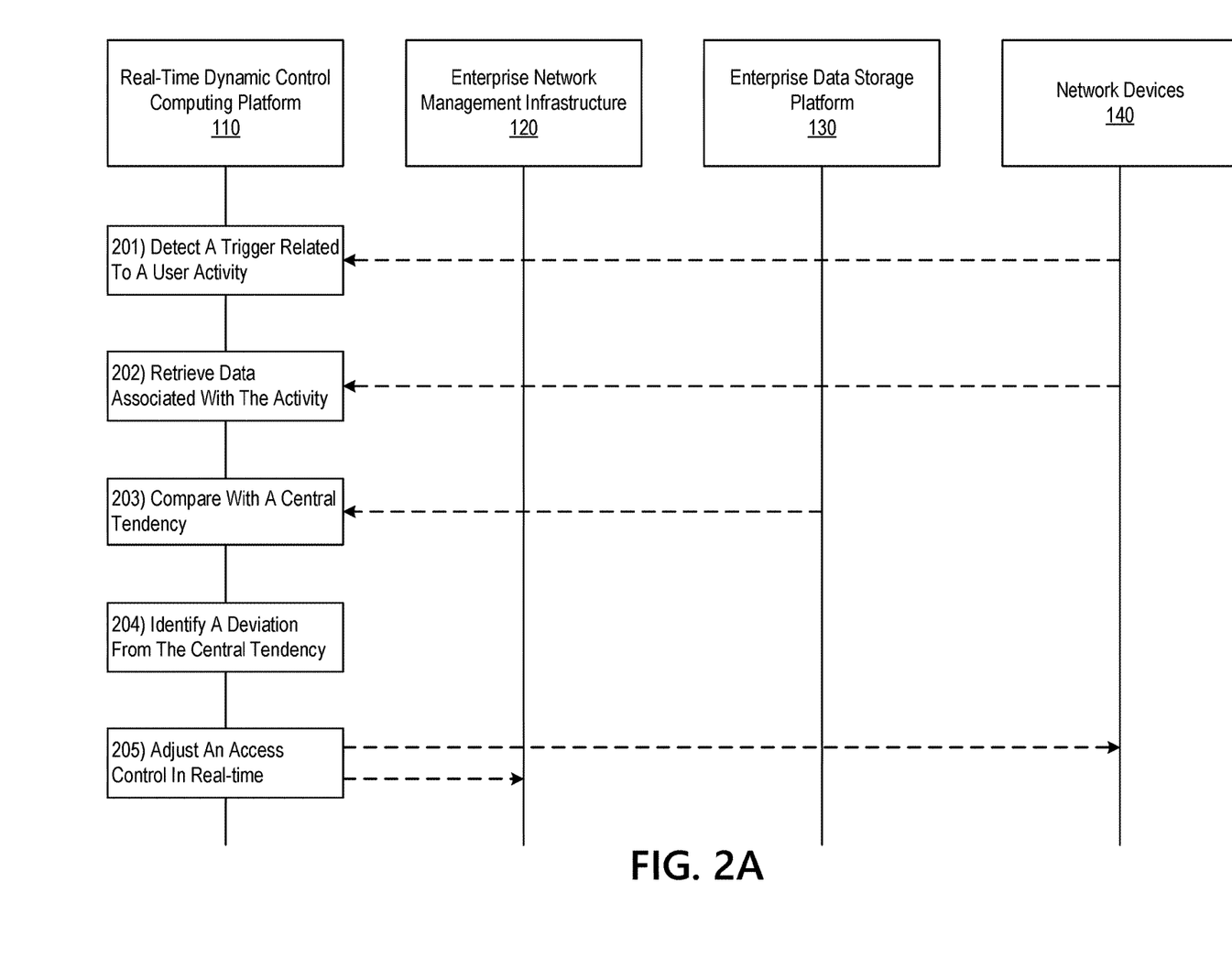
FIGS. 2A and 2B depict an illustrative event sequence for real-time management of access controls in accordance with one or more example embodiments.
Figure 2B:
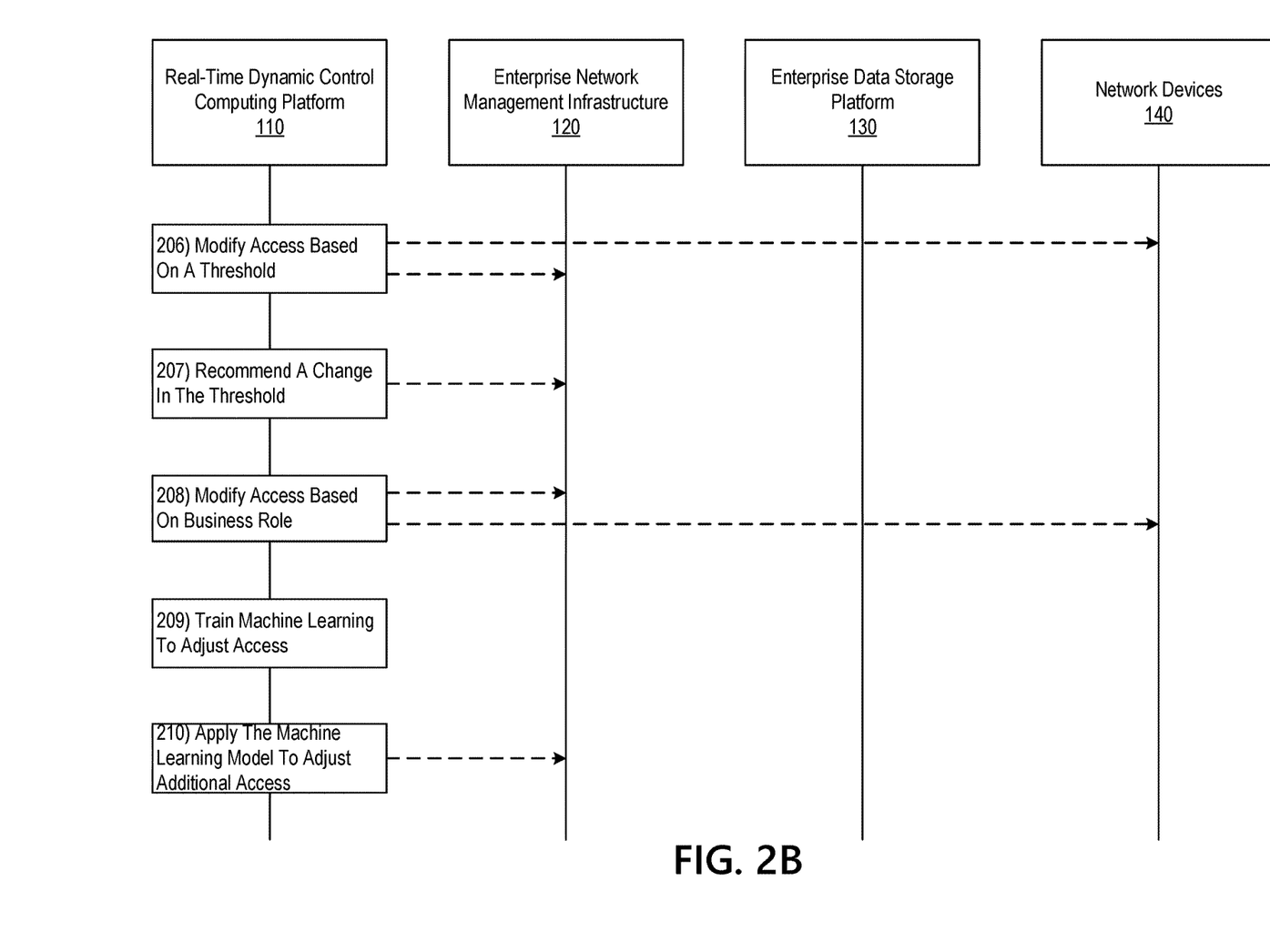

FIGS. 2A and 2B depict an illustrative event sequence for real-time management of access controls in accordance with one or more example embodiments. Referring to FIG. 2A, at step 201, real-time dynamic control computing platform 110 may detect, via a communication interface, a trigger related to an activity of an enterprise user over a network. For example, at step 201, real-time dynamic control computing platform 110 may detect that user computing device 140(a) has spooled a document to print device 140(c). As another example, real-time dynamic control computing platform 110 may detect that user computing device 140(a) has scanned a document at copy device 140(d). In some embodiments, the trigger may be based on a type of document (e.g., sensitive, and/or highly confidential), a content of the document (e.g., includes personally identifiable information), a source of the document (e.g., from a restricted access database, or from a restricted website), and so forth.

Also, for example, real-time dynamic control computing platform 110 may detect, via building access device 140(b), that an enterprise user has swiped a building access card to enter an office. In some embodiments, the trigger may be based on a time and/or a date of entry, a type of enterprise user, and so forth. For example, real-time dynamic control computing platform 110 may detect a trigger when an enterprise user swipes a building access card to enter the building outside of working hours. As another example, real-time dynamic control computing platform 110 may detect a trigger when an enterprise user swipes a building access card to enter the building, but there is no indication that the enterprise user left the building after a time threshold (e.g., 15 hours).

As another example, real-time dynamic control computing platform 110 may detect, via a communication from, for example, enterprise network management infrastructure 120, that a status and/or business role of an enterprise user has changed within the enterprise organization responsible for enterprise network management infrastructure 120. For example, an enterprise user may have moved from one business unit to another. Also, for example, an enterprise user may have terminated their employment with the enterprise organization.

Real-time dynamic control computing platform 110 may detect additional and/or alternative triggers for the activity of the enterprise user over the network. For example, real-time dynamic control computing platform 110 may detect a trigger for upload activity to a web-based resource. For example, the web-based resource may be on a list of suspicious web-sites and real-time dynamic control computing platform 110 may detect a trigger indicating upload activity for the website. Additional and/or alternative activities may include, for example, proxy activity, websites that are visited, web activity traffic data, any downloading or uploading activity.

At step 202, real-time dynamic control computing platform 110 may retrieve, via the communication interface and from the network device, data associated with the activity. For example, upon detecting that user computing device 140(a) has spooled a document to print device 140(c), real-time dynamic control computing platform 110 may retrieve data associated with the printing activity. In some embodiments, real-time dynamic control computing platform 110 may retrieve the data via an application programming interface associated with the network device. For example, real-time dynamic control computing platform 110 may communicate with print device 140(c), and retrieve data such as a type of document (e.g., sensitive, and/or highly confidential), a content of the document (e.g., includes personally identifiable information), a source of the document (e.g., from a restricted access database, or from a restricted website), a number of pages spooled, a document format (e.g., a word document, an image in JPEG format, a web page, a portable document format (PDF)), and so forth.

As another example, upon detecting, via building access device 140(b), that an enterprise user has swiped a building access card to enter an office, real-time dynamic control computing platform 110 may retrieve data from building access device 140(b). Such data may include, for example, details about the building that is accessed, details about who has accessed the building, a time of entry and/or a time of exit, images from a surveillance camera at the building, and so forth.

Also, for example, upon detecting that a status and/or a business role of an enterprise user has changed within the enterprise organization, real-time dynamic control computing platform 110 may retrieve data from enterprise data storage platform 130. Such data may include, for example, details about the enterprise user's current and new role, details about access permissions associated with each role, and so forth. Also, for example, upon detecting that an employment relationship for the enterprise user is terminated, such data may include, for example, details about the date of termination, nature of the termination (e.g., by resignation, terminated by the enterprise organization, retirement, termination due to a security breach, termination due to a violation of one or more rules of the enterprise organization data), data on enterprise resources accessible to the enterprise user, and so forth.

In some embodiments, real-time dynamic control computing platform 110 may provide the retrieved data to enterprise data storage platform 130. Accordingly, enterprise data storage platform 130 may function as a repository of historical data.

In some embodiments, real-time dynamic control computing platform 110 may determine, via the computing device, a central tendency for activities with the network device. The central tendency may generally be a typical value for a statistical distribution of data. Various statistical models may be deployed to capture distribution of data, and the central tendency may be indicative of a typical value or a typical range of values for the distribution. For example, the central tendency may be a mean, median, mode, and so forth. Additional and or alternative types of central tendencies may be utilized to determine typical behavior for enterprise users, network devices, types of activities, and so forth. Also, for example, the central tendency may be a typical behavior, not necessarily a numerical value, of an enterprise user, a group of users, an interaction with a network device, and so forth.

Generally, real-time dynamic control computing platform 110 may monitor a hundred thousand instances of activities, with millions of network activity data points. For example, every time an enterprise user is on the network, badging in to a building, logging in to a computing device, printing a document, accessing a web resource, sending and/or receiving an electronic communication, and so forth, such data may be incorporated into one or more statistical models, and the models may be analyzed based on a business role, a geographic region, a group of users, and so forth, to determine central tendencies for an enterprise organization, a business role, a user role, sand so forth. Accordingly, deviations may be determined from such central tendencies to detect a plurality of anomalies.

For example, real-time dynamic control computing platform 110 may determine central tendency for the network device based on an analysis of past activities. For example, real-time dynamic control computing platform 110 may identify an average number of pages spooled per day by enterprise users to print device 140(c), and utilize this as the central tendency. Also, for example, real-time dynamic control computing platform 110 may identify a pattern correlating a time interval (e.g., a time of day, a day of a week) with a number of copies being spooled for printing, and may utilize this as the central tendency. As another example, real-time dynamic control computing platform 110 may identify a pattern for a type of document that may be printed (e.g., data related to how many copies are printed, how many users are printing it, locations where the document is being printed, and so forth), and may utilize this data to determine the central tendency.

As another example, real-time dynamic control computing platform 110 may determine a pattern of interaction with building access device 140(b). For example, entry and exit data may be analyzed based on a time of day (e.g., working, or non-working hours, holidays), a type of building (e.g., high rise, multi-tenant), a number of users with access to the building, a location of the building (e.g., city, suburban, rural), a type of business functions of the enterprise organization that are performed at the building location, a role of the enterprise user, and so forth. Such data may be analyzed to detect statistical patterns, mutual correlations, and so forth. For example, for a certain user, real-time dynamic control computing platform 110 may determine that the user typically enters the building between 7:30-7:50 A.M., and leaves at 5:10 P.M., and may utilize this as the central tendency for the user. A central tendency may also be generated for data based on a group of users, a building, a group of buildings in a geographic region, and so forth.

In some embodiments, a central tendency may be a pattern indicative of a typical behavior and/or activity. For example, real-time dynamic control computing platform 110 may determine a pattern of interaction of an enterprise user with network devices when a change of business role occurs. For example, the interaction may be building access activity. Real-time dynamic control computing platform 110 may determine that an enterprise user typically does not return to a building after termination of employment. Also, for example, real-time dynamic control computing platform 110 may determine that, upon a change in business role, an enterprise user stops interacting with a first building access device and begins interacting with a second building access device. Also, for example, real-time dynamic control computing platform 110 may determine that there may be a threshold of time (e.g., a number of days) when the enterprise user may interact with both the first building access device and the second building access device. Additional and/or alternative patterns may be determined by real-time dynamic control computing platform 110.

In some embodiments, the central tendency may be based on data for a history of interactions of the enterprise user with the network device. For example, real-time dynamic control computing platform 110 may retrieve data about user interactions with a network device. For example, real-time dynamic control computing platform 110 may retrieve, from enterprise data storage platform 130, historical data about a number of pages spooled by the enterprise user to print device 140(*c*). As another example, real-time dynamic control computing platform 110 may retrieve, from enterprise data storage platform 130, historical data about types of documents spooled by the enterprise user to print device 140(*c*). Also, for example, real-time dynamic control computing platform 110 may retrieve, from enterprise data storage platform 130, historical data about location of the enterprise user, and/or user computing device 140(*a*), when documents are spooled by the enterprise user to print device 140(*c*). Such historical data may be analyzed to detect trends, and such trends may be utilized as the central tendency.

In some embodiments, the central tendency may be based on a history of interactions of a group of users with the network device, wherein the group includes the enterprise user. Enterprise network management infrastructure 120 may include various servers and/or databases that may manage access controls for enterprise users based on the one or more user attributes. Generally, access controls may be provided based on job functions, job roles, geographic region, and so forth. Accordingly, real-time dynamic control computing platform 110 may configure enterprise data storage platform 130 to index and/or classify the stored data based on the group of users, and/or their attributes. Real-time dynamic control computing platform 110 may retrieve, from enterprise data storage platform 130, historical data of interactions of the group of users with the network device, analyze such data to detect trends, and utilize the trends as the central tendency.

In some embodiments, the central tendency may be based on real-time data on network activities of all enterprise users. For example, for a large global enterprise organization (e.g., a financial institution), at any time, there may be several interactions between users and network devices. For example, real-time dynamic control computing platform 110 may detect a stream of entry and/or exit data from a plurality of building access devices (e.g., building access device 140(*b*)) located around the globe. Also, for example, real-time dynamic control computing platform 110 may detect a stream of printing data from a plurality of print devices (e.g., print device 140(*c*)) located around the globe. Accordingly, real-time dynamic control computing platform 110 may continue to update the central tendency in real-time based on the real-time data.

At step 203, real-time dynamic control computing platform 110 may compare, via the computing device, the retrieved data with a central tendency for activities with the network device. For example, an enterprise user may spool a thousand copies of a document to print device 140(*c*). Real-time dynamic control computing platform 110 may retrieve such data, and may compare it to a central tendency for the user interaction with print device 140(*c*). As another example, an enterprise user may swipe an access card at building access device 140(*b*) at 2 A.M. Real-time dynamic control computing platform 110 may retrieve such data, and may compare it to a central tendency for the user interaction with building access device 140(*b*). Also, for example, an enterprise user may swipe an access card at building access device 140(*b*) after termination of employment. Real-time dynamic control computing platform 110 may retrieve such data, and may compare it to a central tendency for the user interaction with building access device 140(*b*).

At step 204, real-time dynamic control computing platform 110 may identify, based on the comparing, a deviation from the central tendency. For example, one or more statistical techniques may be utilized to detect anomalies in a statistical distribution of the data. For example, when the data distribution is a normal distribution, real-time dynamic control computing platform 110 may detect a deviation based on a deviation from a median for the normal distribution. Also, for example, the deviation may be dynamically determined based on historical data from activities by enterprise users, and/or based on one or more policies of the enterprise organization.

In some implementations, real-time dynamic control computing platform 110 may retrieve data indicating that an enterprise user has spooled a thousand copies of a document to print device 140(*c*). A central tendency (e.g., an average use) for the enterprise user may be printing 200 pages per week, and an acceptable deviation range may be set at 5%. Accordingly, since 1000 is outside the range of the acceptable deviation from 200, real-time dynamic control computing platform 110 may identify, based on the comparing, the deviation from the central tendency.

As another example, real-time dynamic control computing platform 110 may retrieve data indicating that an enterprise user has spooled a thousand copies of a classified document to print device 140(*c*). A central tendency (e.g., a typical use) for the enterprise user may be to print non-classified documents only. Accordingly, since printing a classified document does not conform to the central tendency, real-time dynamic control computing platform 110 may identify, based on the comparing, the deviation from the central tendency.

Also, for example, real-time dynamic control computing platform 110 may retrieve data indicating that an enterprise user has swiped an access card at building access device 140(*b*) at 2 A.M. A central tendency (e.g., a typical use) for the enterprise user may be to swipe the access card at building access device 140(*b*) between the hours of 8 AM-6

PM. Accordingly, since swiping the access card at building access device 140(*b*) at 2 AM does not conform to the central tendency, real-time dynamic control computing platform 110 may identify, based on the comparing, the deviation from the central tendency.

As another example, real-time dynamic control computing platform 110 may detect that an enterprise user has attempted to send an electronic communication with an attachment of size 100 MB, even though a threshold for attachments is set at 10 MB. Accordingly, as the attachment size of 100 MB is larger than the central tendency of 10 MB, real-time dynamic control computing platform 110 may identify, based on the comparing, the deviation from the central tendency.

At step 205, real-time dynamic control computing platform 110 may adjust, dynamically in real-time and in response to identifying the deviation, an access control for the enterprise user to the network device. For example, a network device, such as, for example, print device 140(*c*) or copy device 140(*d*), may have a control manager that manages access permissions, and/or use thresholds for enterprise users. For example, user computing device 140(*a*) may include a control manager that manages and/or controls devices installed in the user computing device 140(*a*), such as, for example, hard disk drives, sound cards, display monitors, a keyboard, a headset, a camera, a mouse, and so forth. Generally, such access permissions, and/or use thresholds are static. In some instances, such static controls may fail to prevent unauthorized us of enterprise resources. For example, an enterprise user authorized to print 200 copies at a time, may send multiple print requests of less than 200 copies to circumvent the static limit. As another example, building access may generally be administered by a static control. However, an enterprise user may be able to access the building at a later hour and make unauthorized copies, or access files without appropriate oversight. Therefore, there is a need to monitor access controls in real-time and adjust them dynamically in response to potential anomalous activity.

For example, real-time dynamic control computing platform 110 may detect that an enterprise user has attempted to print 1000 copies of a document, where a permissible limit is 250 copies. Accordingly, real-time dynamic control computing platform 110 may adjust, dynamically in real-time, the access control associated with the relevant print device. In some instances, real-time dynamic control computing platform 110 may lower the permissible limit, and/or may prevent the enterprise user from sending print requests. In some instances, real-time dynamic control computing platform 110 may identify printing devices within a vicinity of the relevant printing device, and/or printing devices that are accessible to the enterprise user, and real-time dynamic control computing platform 110 may prevent access to the enterprise user to these devices (e.g., for a certain interval of time).

Also, for example, real-time dynamic control computing platform 110 may detect that an enterprise user has attempted to enter a building outside of regular office hours, and may adjust, dynamically in real-time, the access control associated with the relevant building access device. For example, real-time dynamic control computing platform 110 may prevent access of the enterprise user to the building. In some instances, an authorized enterprise user may be provided a temporary authentication token to access the building outside of normal hours for the enterprise user, and real-time dynamic control computing platform 110 may cause the access control associated with the relevant building access device to display a message requesting the temporary authentication token.

As another example, real-time dynamic control computing platform 110 may detect that an enterprise user has attempted to send an electronic communication with an attachment of size 100 MB, even though a threshold for attachments is set at 10 MB. Accordingly, real-time dynamic control computing platform 110 may cause an access control associated with the electronic mail application to restrict transmission of the email message. In some instances, real-time dynamic control computing platform 110 may cause the access control associated with the electronic mail application to restrict transmission of all email messages for a certain threshold of time. In some embodiments, real-time dynamic control computing platform 110 may adjust, dynamically in real-time, the access control associated with the electronic mail application, to allow attachments of 50 MB in size. Such dynamic control may be based on one or more additional factors, such as, for example, a recent increase in a size of attachments that are being transmitted by enterprise users in a group. For example, there may be an upcoming sales meeting, and enterprise users associated with a sales role may be sending emails with marketing materials. Accordingly, real-time dynamic control computing platform 110 may identify such a trend, and may adjust, dynamically in real-time, the access control for enterprise users associated with a sales role.

In some embodiments, real-time dynamic control computing platform 110 may adjust, dynamically and based on a predictive model, the access control. For example, real-time dynamic control computing platform 110 may detect that an enterprise user has attempted to print 1000 copies, which exceeds the allowable limit of 250 copies. In some instances, real-time dynamic control computing platform 110 may detect a second attempt by the enterprise user to print 200 copies. Accordingly, real-time dynamic control computing platform 110 may predict that the enterprise user is attempting to circumvent the static controls in an effort to print the 1000 copies. Accordingly, real-time dynamic control computing platform 110 may adjust the access controls of one or more devices to prevent unauthorized use.

As another example, real-time dynamic control computing platform 110 may detect that an enterprise user has attempted to enter a building at 2 AM. Based on identifying a deviation from a central tendency for entry/exit data, real-time dynamic control computing platform 110 may predict that the enterprise user may be accessing the building to attempt an unauthorized use of enterprise resources. Accordingly, real-time dynamic control computing platform 110 may activate one or more surveillance cameras to monitor the enterprise user's activities inside the building, dynamically prevent access of the enterprise user to enterprise resources, such as, for example, file access and/or retrieval from a database, access to print and/or scanning devices, access to external web resources, prevent an ability to send electronic communications to recipients outside the enterprise organization, and so forth. As another example, upon detecting a computing device associated with the user on an enterprise network, real-time dynamic control computing platform 110 may configure an access manager for the computing device to deactivate access by external devices (e.g., a USB device, a hard disk drive, a CD-RW, a wireless device, and so forth).

Generally, as described herein, identifying a deviation from the central tendency with respect to one activity of an enterprise user over a network may trigger adjusting access controls for the same activity, another activity (with the same or another device), or a multitude of combinations of activities. Accordingly, in some embodiments, real-time dynamic control computing platform 110 may identify, in response to adjusting the access control of the enterprise user, an additional access control. In some embodiments, real-time dynamic control computing platform 110 may adjust, dynamically in real-time, the additional access control. For example, real-time dynamic control computing platform 110 may dynamically adjust a number of copies of a document that may be printed by the enterprise user. However, real-time dynamic control computing platform 110 may also dynamically update a folder access permission for a folder that includes the document being printed. Also, for example, in response to detecting an attempt to access a building, real-time dynamic control computing platform 110 may dynamically update the control managers for all building access devices associated with the relevant building (and, in some instances, buildings in a vicinity of the relevant building).

Referring to FIG. 2B, at step 206, real-time dynamic control computing platform 110 may identify a threshold associated with the access control, and adjust the access control based on the threshold. For example, real-time dynamic control computing platform 110 may identify a threshold associated with a number of copies (e.g., 200) an enterprise user is permitted to print. Accordingly, real-time dynamic control computing platform 110 may adjust the access control based on the threshold. For example, real-time dynamic control computing platform 110 may adjust the access control to either temporarily disable the enterprise user's ability to print, and/or may reduce the permissible number of pages to a smaller number. Also, for example, real-time dynamic control computing platform 110 may identify a threshold associated with a building access (e.g., 8 AM-5 PM) for an enterprise user. Accordingly, real-time dynamic control computing platform 110 may adjust the access control based on the threshold. For example, real-time dynamic control computing platform 110 may adjust the access control to either temporarily disable the enterprise user's ability to enter a building, and/or may reduce the permissible entry times.

At step 207, real-time dynamic control computing platform 110 may recommend, based on the deviation, a change in the threshold. For example, real-time dynamic control computing platform 110 may detect a deviation from the central tendency, and upon such detection, may recommend a change in a threshold for the enterprise user, and/or the network device. In some instances, real-time dynamic control computing platform 110 may configure a network device to reflect the recommended threshold. In some instances, real-time dynamic control computing platform 110 may send a notification with the recommendation to appropriate personnel (e.g., security personnel, management personnel, and so forth).

In some embodiments, real-time dynamic control computing platform 110 may detect that enterprise users associated with certain business roles are less likely to send large print requests, and may recommend a change in the threshold for printing. For example, enterprise users associated with a litigation department of an enterprise organization may typically spool a large number of printing requests. On the other hand, enterprise users associated with a sales department of an enterprise organization may typically spool a smaller number of printing requests. Accordingly, real-time dynamic control computing platform 110 may identify such organizational behavior and may recommend an increase in a threshold for a permissible number of pages to be printed for enterprise users associated with the litigation department, and may recommend a decrease in a threshold for enterprise users associated with the sales department.

As another example, enterprise users associated with an executive role of an enterprise organization may typically enter and/or exit a building at all hours. However, enterprise users associated with an administrative role of an enterprise organization may typically enter and/or exit a building during regular business hours only. Accordingly, real-time dynamic control computing platform 110 may identify such role-based behavior and may recommend an increase in a threshold of entry and/or exit time ranges for enterprise users associated with the executive role, and may recommend a decrease in a threshold of entry and/or exit time ranges for enterprise users associated with the administrative role.

At step 208, real-time dynamic control computing platform 110 may, upon receiving an indication of a change of a business role of the enterprise user, adjust the access control based on the change of the business role. For example, a business role of an enterprise user may change (e.g., via retirement, termination of employment, change in a business unit within the enterprise organization, and so forth). In such instances, access permissions for the enterprise user may need to be modified. For example, in the event of a termination of employment, a building access of the enterprise user may be deactivated. Also, for example, access to enterprise resources may be deactivated. Likewise, in the event of a change in a business function within the enterprise organization, one or more file access permissions for the enterprise user may be modified. For example, the enterprise user may leave a human resource role and move to an accounting role. Accordingly, enterprise user's access to personally identifiable information and/or other confidential information may be deactivated. At the same time, one or more access permissions associated with a business role may be activated. Accordingly, real-time dynamic control computing platform 110 may adjust the access control based on the change of the business role.

As another example, in the event of a termination of employment of an enterprise user, real-time dynamic control computing platform 110 may adjust a number of thresholds for the enterprise user during a time threshold prior to termination (e.g., next two weeks). In some instances, real-time dynamic control computing platform 110 may prohibit outbound emails unless reviewed by a manager assigned to the enterprise user. Also, for example, real-time dynamic control computing platform 110 may prohibit printing unless reviewed by a manager assigned to the enterprise user. As another example, real-time dynamic control computing platform 110 may limit access to specific software applications, web resources, and/or file folders to those that may be essential to termination processes. In some instances, real-time dynamic control computing platform 110 may receive instructions from a manager to restrict access for the enterprise user to confidential information, personally identifiable information, and so forth, and real-time dynamic control computing platform 110 may identify resources that may include such types of information, and restrict access to such resources.

At step 209, real-time dynamic control computing platform 110 may train a machine learning model to adjust the access control. For example, real-time dynamic control computing platform 110 may train a machine learning model to learn behaviors of enterprise users, groups of enterprise users, and so forth. For example, real-time dynamic control computing platform 110 may train a machine learning model to learn that when an enterprise user associated with a legal role receives an electronic communication to work on a certain legal project, the electronic communication may trigger a range on network activity, such as, for example, accessing the relevant document folders in an enterprise data storage platform (e.g., enterprise data storage platform 130), sending and receiving communications with large attachments, perhaps accessing a building outside of regular working hours, and so forth. Accordingly, real-time dynamic control computing platform 110 may train the machine learning model to detect the initial electronic communication to work on a certain legal project, and may train the machine learning model to dynamically adjust the access controls in anticipation of the increased network activity.

As another example, real-time dynamic control computing platform 110 may train a machine learning model to learn entry/exit times at different geographical locations and detect patterns of traffic. For example, building access activity for a building located in a large metropolitan city may be different from building access activity for a building located in a suburb. Accordingly, real-time dynamic control computing platform 110 may train a machine learning model to dynamically adjust the access control based on such building access activity.

In some embodiments, real-time dynamic control computing platform 110 may train a machine learning model to detect the patterns of entry/exit data based on business roles. For example, the machine learning model may analyze entry/exit data to infer that enterprise users associated with a first role may typically enter a building at 8 AM and may exit the building at 5 PM. Accordingly, real-time dynamic control computing platform 110 may train the machine learning model to dynamically adjust the access control based on such role-based access activity. Also, for example, real-time dynamic control computing platform 110 may train a machine learning model to dynamically recommend thresholds and/or access permissions for enterprise users. For example, the machine learning model may analyze patterns of network activity to determine groups of users that are associated with certain enterprise applications, and may correlate such associations with a plurality of characteristics, such as, for example, types of repositories accessed within enterprise data storage platform 130, a number of emails sent and received, a number of print jobs spooled, an amount of time spent inside a building, and so forth. Accordingly, real-time dynamic control computing platform 110 may train the machine learning model to dynamically adjust access controls based on such network activity.

Generally, machine learning, as described herein, may be supervised or unsupervised. For example, training data may be generated for applications as described herein, and such training data may be supervised to train the model, improve performance, improve reliability, and so forth. For example, upon determination of a threshold for an interaction of an enterprise user with a network device, real-time dynamic control computing platform 110 may send a notification to a manager of the enterprise user to confirm the threshold. In some instances, the manager may accept the recommended threshold, and/or change the recommendation. Such input may be used as training data for the machine learning model.

At step 210, real-time dynamic control computing platform 110 may apply the machine learning model to adjust additional access controls associated with the enterprise user. For example, the machine learning model may learn that it is typical for an enterprise user to attach a document in an electronic communication after the enterprise user visits a web resource. Accordingly, real-time dynamic control computing platform 110 may apply the machine learning model to detect user activity with the web resource, and dynamically adjust an attachment size for the electronic communication.

As another example, the machine learning model may learn that it is typical for an enterprise user, upon being terminated, to download one or more files from enterprise data storage platform 130. Accordingly, real-time dynamic control computing platform 110 may apply the machine learning model to detect that an enterprise user has been terminated, and dynamically adjust access permissions for the enterprise user.

Also, for example, the machine learning model may learn that it is typical for enterprise users associated with an accounting role to have increased network activity when a fiscal quarter, and/or a fiscal year is nearing its end. Accordingly, real-time dynamic control computing platform 110 may apply the machine learning model to dynamically adjust access permissions for the enterprise users associated with the accounting role within a time interval (e.g., 4 weeks) before the end of the quarter, and/or fiscal year.

Figure 3:
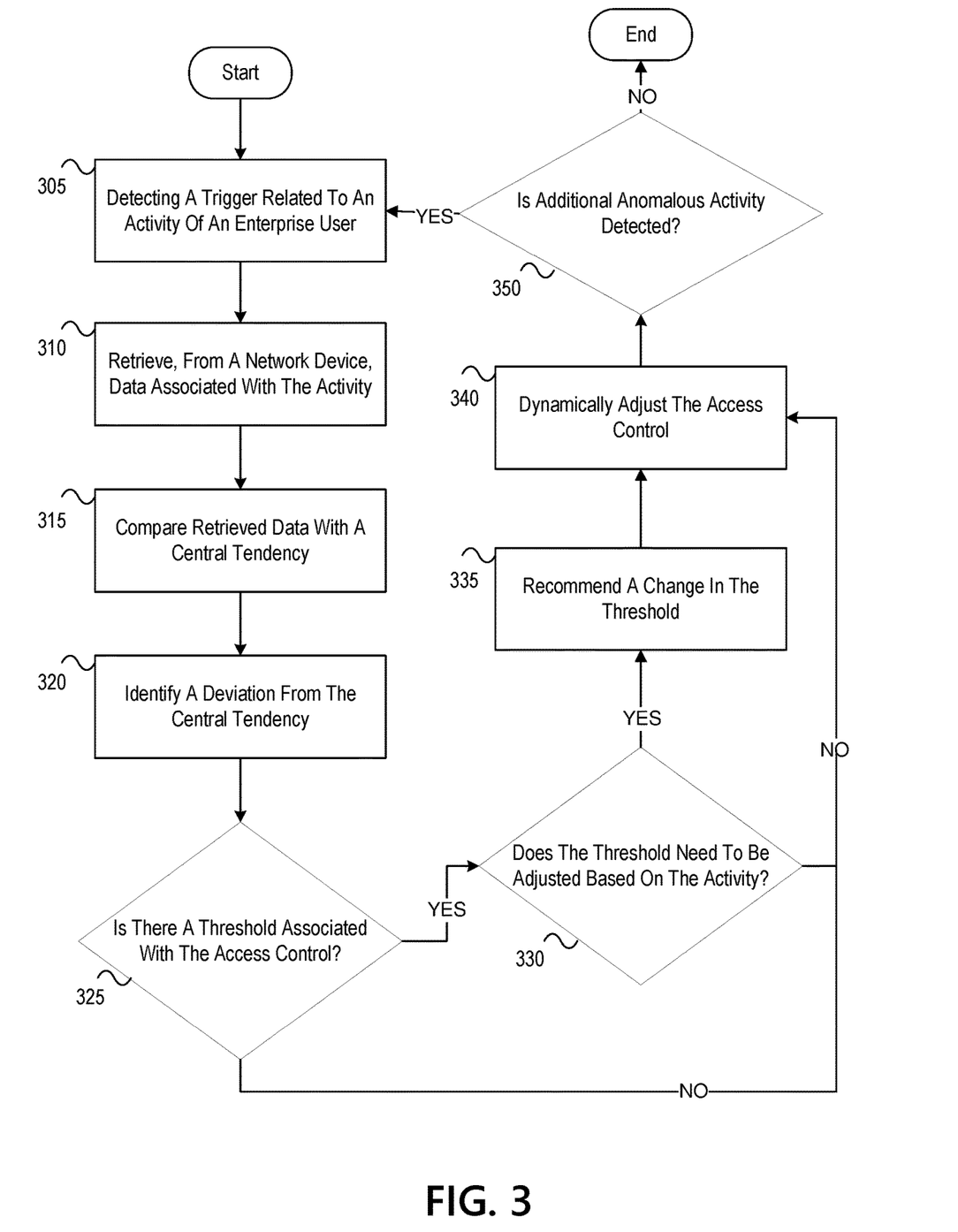
FIG. 3 depicts an illustrative method for real-time management of access controls in accordance with one or more example embodiments.

FIG. 3 depicts an illustrative method for real-time management of access controls in accordance with one or more example embodiments. Referring to FIG. 3, at step 305, a computing platform having at least one processor, a communication interface, and memory may detect, via the communication interface, a trigger related to an activity of an enterprise user over a network. At step 310, the computing platform may retrieve, via the communication interface and from the network device, data associated with the activity.

At step 315, the computing platform may compare, via the computing device, the retrieved data with a central tendency for activities with the network device. At step 320, the computing platform may identify, based on the comparing, a deviation from the central tendency. At step 325, the computing platform may determine if there is a threshold associated with the access control. If at step 325, the computing platform determines that there is a threshold associated with the access control, the process may move to step 330. If at step 325, the computing platform determines that there is no threshold associated with the access control, the process may proceed to step 340.

At step 330, the computing platform may determine if the threshold may need to be adjusted based on the activity. If at step 330, the computing platform determines that the threshold needs to be adjusted based on the activity, the process may move to step 335. At step 335, the computing platform may recommend, based on the deviation, a change in the threshold. If at step 330, the computing platform determines that the threshold does not need to be adjusted based on the activity, the process may proceed to step 340. At step 340, the computing platform may adjust, dynamically in real-time and in response to identifying the deviation, an access control for the enterprise user to the network device.

At step 350, the computing platform may determine if additional anomalous activity is detected over the network. An anomalous activity is generally any activity that is a deviation from a central tendency. If at step 350, the computing platform determines that an additional anomalous activity is detected, the process may return to step 305. If at step 350, the computing platform determines that an additional anomalous activity is not detected, the process may terminate.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to implement one or more aspects of the disclosure more effectively, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
detect, via the communication interface, a trigger related to an activity of an enterprise user over a network;
retrieve, via the communication interface, via an application programming interface associated with a network device and from the network device, data associated with the activity;
compare, via the computing platform, the retrieved data with a central tendency for activities with the network device;
identify, based on the comparing, a deviation from the central tendency;
adjust, dynamically in real-time and in response to identifying the deviation, an access control for the enterprise user to the network device;
identify a threshold associated with the access control;
adjust the access control based on the threshold;
recommend, based on the deviation, a change in the threshold;
train a machine learning model to adjust the access control;
apply the machine learning model to adjust additional access controls associated with the enterprise user; and
further adjust, dynamically and based on a predictive model, the access control.

2. The computing platform of claim 1, wherein the central tendency is based on a history of interactions of the enterprise user with the network device.

3. The computing platform of claim 1, wherein the central tendency is based on a history of interactions of a group of users with the network device, wherein the group includes the enterprise user.

4. The computing platform of claim 1, wherein the central tendency is based on real-time data on network activities of all enterprise users.

5. The computing platform of claim 1, wherein the trigger is an indication of a change of a business role of the enterprise user, and wherein the instructions to adjust the access control comprise additional computer-readable instructions that, when executed by the at least one processor, cause the computing platform to:
adjust the access control based on the change of the business role.

6. The computing platform of claim 1, wherein the memory stores additional computer-readable instructions that, when executed by the at least one processor, cause the computing platform to:
identify, in response to adjusting the access control of the enterprise user, an additional access control; and
adjust, dynamically in real-time, the additional access control.

7. A method, comprising:
at a computing platform comprising at least one processor, a communication interface, and memory:

detecting, via the communication interface, a trigger related to an activity of an enterprise user over a network;

retrieving, via the communication interface, via an application programming interface associated with a network device and from the network device, data associated with the activity;

comparing, via the computing platform, the retrieved data with a central tendency for activities with the network device;

identifying, based on the comparing, a deviation from the central tendency;

adjusting, dynamically in real-time and in response to identifying the deviation, an access control for the enterprise user to the network device;

identifying a threshold associated with the access control;

adjusting the access control based on the threshold;

recommending, based on the deviation, a change in the threshold;

training a machine learning model to adjust the access control;

applying the machine learning model to adjust additional access controls associated with the enterprise user; and further adjusting, dynamically and based on a predictive model, the access control.

8. The method of claim 7, wherein the trigger is an indication of a change of a business role of the enterprise user, and further comprising:

adjusting the access control based on the change of the business role.

9. The method of claim 7, wherein the central tendency is based on a history of interactions of the enterprise user with the network device.

10. The method of claim 7, wherein the central tendency is based on a history of interactions of a group of users with the network device, wherein the group includes the enterprise user.

11. The method of claim 7, wherein the central tendency is based on real-time data on network activities of all enterprise users.

12. The method of claim 7 further comprising:

identifying, in response to adjusting the access control of the enterprise user, an additional access control; and adjusting, dynamically in real-time, the additional access control.

13. One or more non-transitory computer-readable media storing instructions that, when executed by a computing platform comprising at least one processor, a communication interface, and memory, cause the computing platform to:

detect, via the communication interface, a trigger related to an activity of an enterprise user over a network;

retrieve, via the communication interface, via an application programming interface associated with a network device and from the network device, data associated with the activity;

compare, via the computing platform, the retrieved data with a central tendency for activities with the network device;

identify, based on the comparing, a deviation from the central tendency;

adjust, dynamically in real-time and in response to identifying the deviation, an access control or multiple access controls for the enterprise user to the network device;

identify a threshold associated with the access control;

adjust the access control based on the threshold;

recommend, based on the deviation, a change in the threshold;

train a machine learning model to adjust the access control;

apply the machine learning model to adjust additional access controls associated with the enterprise user; and further adjust, dynamically and based on a predictive model, the access control.

14. The one or more non-transitory computer-readable media storing instructions of claim 13, wherein the central tendency is based on a history of interactions of the enterprise user with the network device.

15. The one or more non-transitory computer-readable media storing instructions of claim 13, wherein the central tendency is based on a history of interactions of a group of users with the network device, wherein the group includes the enterprise user.

16. The one or more non-transitory computer-readable media storing instructions of claim 13, wherein the central tendency is based on real-time data on network activities of all enterprise users.

17. The one or more non-transitory computer-readable media of claim 13, wherein the trigger is an indication of a change of a business role of the enterprise user and wherein the instructions, when executed by the computing platform, cause the computing platform to:

adjust the access control based on the change of the business role.

18. The one or more non-transitory computer-readable media of claim 13, wherein the instructions, when executed by the computing platform, cause the computing platform to:

identify, in response to adjusting the access control of the enterprise user, an additional access control; and adjust, dynamically in real-time, the additional access control.

* * * * *